US012385616B1

(12) United States Patent
Leang (10) Patent No.: US 12,385,616 B1
(45) Date of Patent: Aug. 12, 2025

(54) VEHICLE AUXILIARY LIGHT LUMINAIRE BEZEL ATTACHMENT ASSEMBLY

(71) Applicant: KC IP HOLDINGS, LLC, Gardena, CA (US)

(72) Inventor: Bobby Leang, Los Angeles, CA (US)

(73) Assignee: KC IP HOLDINGS, LLC, Gardena, CA (US)

( * ) Notice: Subject to any disclaimer, the term of this patent is extended or adjusted under 35 U.S.C. 154(b) by 0 days.

(21) Appl. No.: 18/318,980

(22) Filed: May 17, 2023

Related U.S. Application Data (60) Continuation of application No. 18/047,388, filed on Oct. 18, 2022, now Pat. No. 11,674,657, which is a
(Continued)

(51) Int. Cl.
| | |
|---|---|
| *F21S 41/29* | (2018.01) |
| *B60Q 1/24* | (2006.01) |
| *F21S 41/143* | (2018.01) |
| *F21V 17/00* | (2006.01) |
| *F21V 17/12* | (2006.01) |
| *F21S 41/32* | (2018.01) |
| *F21S 41/36* | (2018.01) |
| *F21S 45/10* | (2018.01) |
| *F21S 45/47* | (2018.01) |
| *F21V 23/06* | (2006.01) |
| *F21Y 103/10* | (2016.01) |
| *F21Y 115/10* | (2016.01) |

(52) U.S. Cl.
CPC ............... *F21S 41/29* (2018.01); *B60Q 1/24* (2013.01); *F21S 41/143* (2018.01); *F21V 17/005* (2013.01); *F21V 17/12* (2013.01); *F21S 41/321* (2018.01); *F21S 41/36* (2018.01); *F21S 45/10* (2018.01); *F21S 45/47* (2018.01); *F21V 23/06* (2013.01); *F21Y 2103/10* (2016.08); *F21Y 2115/10* (2016.08)

(58) Field of Classification Search
CPC ........ F21S 41/29; F21S 41/295; F21V 17/005
See application file for complete search history.

(56) References Cited

U.S. PATENT DOCUMENTS

| | | | |
|---|---|---|---|
| 4,725,929 | A | 2/1988 | Huang |
| 5,068,768 | A | 11/1991 | Kobayashi |

(Continued)

FOREIGN PATENT DOCUMENTS

| | | |
|---|---|---|
| CN | 202806616 U | 3/2013 |
| CN | 203186200 U | 9/2013 |

(Continued)

*Primary Examiner* — Sean P Gramling
(74) *Attorney, Agent, or Firm* — Stetina Garred Brucker & Newboles (57) ABSTRACT

A luminaire bezel attachment assembly with a lens that is defined by a lens body with one or more bezel engagement keyways, and a flange around the lens body. An inner bezel is coupled to the lens and defined by one or more inner bezel keys receivable within the corresponding one of the one or more bezel engagement keyways of the lens. An outer bezel is coupled to the lens and defined by one or more outer bezel keys that are receivable within the corresponding one of the one or more bezel engagement keyways of the lens. The outer bezel keys overlap the corresponding one of the one or more inner bezel keys.

19 Claims, 7 Drawing Sheets

Related U.S. Application Data division of application No. 16/870,701, filed on May 8, 2020, now Pat. No. 11,486,556.

(56) References Cited

U.S. PATENT DOCUMENTS

| | | |
|---|---|---|
| 6,893,147 B2 | 5/2005 | Schottland et al. |
| 9,625,127 B2 | 4/2017 | Thomsen et al. |
| 2008/0084705 A1 | 4/2008 | Helwig et al. |
| 2008/0089060 A1 | 4/2008 | Kondo et al. |
| 2015/0023011 A1* | 1/2015 | Takei ............ F21V 23/0464 362/231 |
| 2019/0376661 A1 | 12/2019 | Knettle et al. |

FOREIGN PATENT DOCUMENTS

| | | |
|---|---|---|
| CN | 105522953 A | 4/2016 |
| EP | 1693249 A2 | 8/2006 |
| KR | 1020020076942 A | 10/2002 |

* cited by examiner

VEHICLE AUXILIARY LIGHT LUMINAIRE BEZEL ATTACHMENT ASSEMBLY

CROSS-REFERENCE TO RELATED APPLICATIONS

This application is a continuation of pending U.S. application Ser. No. 18/047,388 filed Oct. 18, 2022 and entitled "VEHICLE AUXILIARY LIGHT LUMINAIRE BEZEL ATTACHMENT ASSEMBLY" which is a divisional patent application of U.S. patent application Ser. No. 16/870,701 filed May 8, 2020 (now U.S. Pat. No. 11,486,556 issued Nov. 1, 2022) and entitled "VEHICLE AUXILIARY LIGHT LUMINAIRE BEZEL ATTACHMENT ASSEMBLY", the entire disclosures of which are wholly incorporated by reference herein.

STATEMENT RE: FEDERALLY SPONSORED RESEARCH/DEVELOPMENT

Not Applicable

BACKGROUND

1. Technical Field

The present disclosure relates generally to vehicle lighting, and more particularly to a luminaire bezel attachment assembly for a vehicle auxiliary light.

2. Related Art

Automobiles and other motor vehicles are equipped with a variety of lighting systems that serve illumination, indication and/or alert functions. For example, headlamps installed on the front end illuminate the travel path ahead of the vehicle, while the taillights installed on the rear end may indicate the presence of the vehicle to others traveling behind it. The taillight may be flashed at an increased intensity in response to the activation of the brakes, thereby alerting nearby vehicles that it is slowing down. Furthermore, the taillight cluster may include left and right turn signal lights, reverse indicator lights, and so forth.

Different regulations govern the performance of headlamps installed on vehicles permitted to travel on public roads. In the United States, this is set forth in Federal Motor Vehicle Safety Standard 108 that incorporate the SAE (Society of Automotive Engineers) technical standards. Among the performance parameters set forth in this standard include low beam and high beam functions, as well as permitted glare parameters, the minimum amount of light to be axially projected from the headlamp, minimum and maximum beam heights, headlamp aiming, cutoffs, and so forth. For most low visibility conditions encountered during the nighttime or in inclement weather while traveling on a roadway, the standard headlamps may be sufficient for safe vehicle operation. Some models may be equipped with foglamps that are aimed lower than the low beam headlamp to provide illumination of the road in more extreme fog, rain, dust, and snow conditions while minimizing glare, but this is the typical extent of original equipment.

Vehicles are not limited to being driven on conventional paved roads, and there are many professional as well as recreational off-road driving applications that may take a vehicle through rough, unpaved trails comprised of gravel, rocks, sand, snow, and mud. Typical off-road vehicles are either designed or modified to have higher clearance and greater axle articulation. Furthermore, such vehicles may have drive trains operable in four-wheel drive, locking differentials, off-road tires, and the like to better traverse the varied terrain encountered in off-road driving.

Beyond these modifications, off-road vehicles may also be equipped with various auxiliary lights that provide additional illumination during nighttime/low visibility driving over difficult terrain, where careful and detailed identification is necessary for safe operation. Different types of auxiliary lights improve upon the illumination provided from the original equipment headlamps in different ways. For instance, spotlights may produce a focused beam of light to distances that extend beyond the light emitted from headlamps at greater illumination intensities. Floodlights may have a wider beam pattern at closer distances, while also outputting light after greater illumination intensities. Some auxiliary lights combine multiple spotlights in an array, also referred to as a light bar, while others combine different types to achieve a specific beam pattern. As there is usually no expectation of encountering same direction or oncoming traffic during off-road travel, auxiliary lights are not restricted with respect to light intensity, projection distance, glare, and aiming restrictions that otherwise govern headlamps for on-road use.

Like other types of vehicle lights, auxiliary lights are configured as one or more self-contained units or luminaires each with a housing, a light source (halogen, high intensity discharge, or light emitting diode), a reflector, and a lens. The light source may be connected to the vehicle electrical system and controlled via dashboard switches. Regardless of type, durability and resistance to incursion of foreign particles frequently encountered during off-road travel is important, as auxiliary lights are externally mounted such as on the roof, the bonnet, or the bumper of the vehicle and exposed to the elements. Furthermore, because extensive efforts toward customization are made by off-road enthusiasts, it would be desirable to provide a variety of options for accents/highlight features of the auxiliary lights that enhance the visual appearance of the vehicles.

Accordingly, there is a need in the art for an improved auxiliary light luminaire. There is also a need in the art for an improved bezel attachment assembly for a luminaire of a vehicle auxiliary light.

BRIEF SUMMARY

One embodiment of the present disclosure is a luminaire bezel attachment assembly. The assembly may include a lens that is defined by a lens body and a flange around the lens body. The lens body may further define one or more bezel engagement keyways. The assembly may also include an inner bezel coupled to the lens. The inner bezel may be defined by one or more inner bezel keys receivable within the corresponding one of the one or more bezel engagement keyways of the lens. The assembly may also include an outer bezel that is coupled to the lens. The outer bezel may be defined by one or more outer bezel keys that are receivable within the corresponding one of the one or more bezel engagement keyways of the lens. The outer bezel keys may also overlap the corresponding one of the one or more inner bezel keys.

Another embodiment of the present disclosure is a luminaire, which may include a housing, one or more illumination sources, and a bezel attachment assembly. The housing may define at least an open front end with a rim, the rim further defining one or more fastener bores. The illumination sources may be mounted to the housing. The luminaire may also include a lens that can be attached to the housing. The lens may further be defined by a lens body and a flange around the lens body. The lens body may define one or more bezel engagement keyways, while the flange may define one or more fastener apertures aligned with a respective one of the one or more fastener bores in turn defined by the rim of the housing. There may also be an inner bezel that is coupled to the lens and defined by one or more inner bezel keys receivable within the corresponding one of the one or more bezel engagement keyways of the lens. Each of the inner bezel keys may further define a central fastener slot axially aligned with a respective one of the fastener bores. The bezel attachment assembly may also include an outer bezel that is coupled to the lens. The outer bezel may be defined by one or more outer bezel keys receivable within the corresponding one of the one or more bezel engagement keyways of the lens. Additionally, the outer bezel may overlap the corresponding one of the one or more inner bezel keys. Each of the outer bezel keys may define a central fastener hole axially aligned with a respective one of the fastener bores.

Still another embodiment of the present disclosure is a luminaire bezel attachment assembly. The assembly may include a lens that is defined by a raised platform and a flange rim. The raised platform may define one or more bezel engagement notches. The assembly may also have a first interlocking bezel that includes one or more inwardly extending tabs receivable within a corresponding one of the one or more bezel engagement notches defined on the lens. The assembly may also include a second interlocking bezel with one or more inwardly extending tabs that are receivable within a corresponding one of the one or more bezel engagement notches defined on the lens. The tabs may also face the corresponding one of the one or more inwardly extending tabs of the first interlocking bezel.

The present disclosure also includes another embodiment of the luminaire bezel attachment assembly. There may be a lens defined by one or more raised platforms and a flange section around the one or more raised platforms. There may also be one or more first annular interlocking bezels each fitted around a respective one of the raised platforms of the lens and each being defined by an outer rim and an inner rim, the outer rim further defining one or more engagement recesses. The assembly may further include one or more second annular interlocking bezels, each of which may be fitted around the outer rim of the respective one of the first annular interlocking bezels. The second annular interlocking bezels may also be defined by an outer rim and an inner rim. The inner rim may include one or more inwardly extending tabs received within a corresponding one of the one or more engagement recesses of the respective one of the first annular interlocking bezels.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a vehicle auxiliary light luminaire bezel attachment and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figures 1, 2:
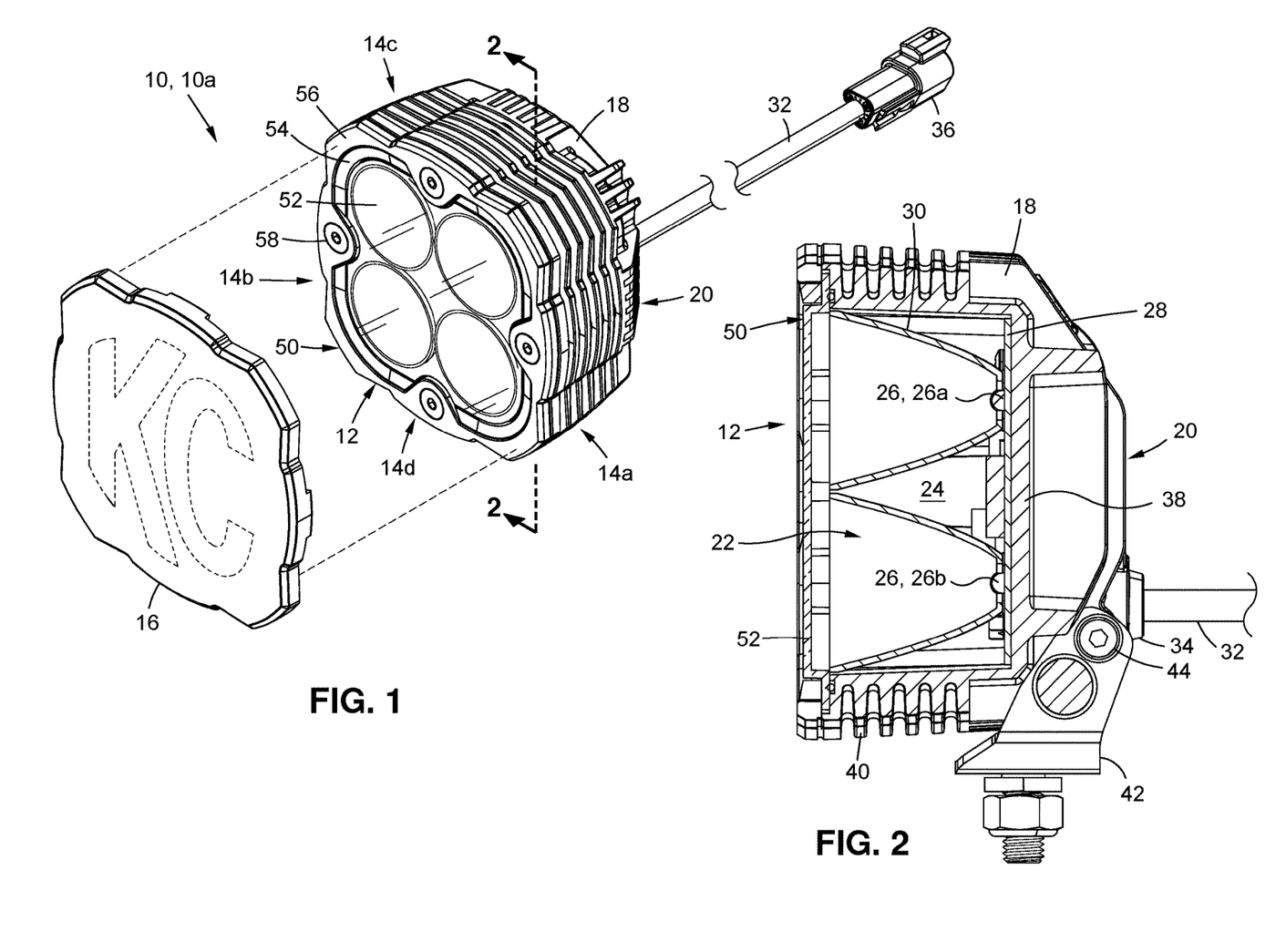
FIG. 1 is a front perspective view of one embodiment of a vehicle auxiliary light with a quadrangular front face.
FIG. 2 is a cross-sectional view of the vehicle auxiliary light along axis 2-2 of FIG. 1.

FIG. 1 illustrates a vehicle auxiliary light luminaire 10a in accordance with a first embodiment of the present disclosure. This embodiment of the luminaire 10 is understood to have a generally quadrangular configuration, that is, a front face 12 that is broadly characterized by four sides: a left side 14a, a right side 14b opposed thereto, a top side 14c, and a bottom side 14d opposed thereto. Although these sides 14a-14d may have further sub segments angled relative to each other, these are understood to be aesthetic enhancements and so the front face 12 may nevertheless be referred to as having a generally quadrangular or square shape. The quadrangular configuration is presented by way of example only and not of limitation, and another variation or embodiment is shown further below. The shape of the front face 12 may be varied without departing from the disclosure.

By way of example, there may also be a cover 16 that may be fitted over the front face 12 of the luminaire 10. The outer shape of the cover 16 is understood to conform to that of the front face 12, though slightly undersized. In one embodiment, the cover 16 may be constructed of plastic or other flexibly resilient material that retains its shape and compressively retained on the luminaire 10.

With additional reference to FIG. 2, the luminaire 10 includes a housing 18 defined by a closed rear end 20 and an open front end 22 to a hollow interior 24. Disposed within the hollow interior may be an illumination source 26, which in the exemplary embodiment of the luminaire 10a, there may be four. In the cross-sectional view of FIG. 2, a first illumination source 26a and a second illumination source 26b is shown mounted to a printed circuit board 28. The illumination source 26 may be a light emitting diode (LED), though any other illumination source such as high-intensity discharge (HID) lamps, halogen lamps, incandescent lamps, or the like may be substituted. The output that is generated by the LED illumination source 26 may be omnidirectional but may be directed toward the open front end 22 with a reflector 30 mounted to the hollow interior 24 of the housing 18. The electrical power for the illumination source 26 may be provided by the vehicle electrical system via a wiring harness 32 extending into the housing 18 from the closed rear end 20 thereof. In order to minimize the incursion of dust and moisture into the hollow interior 24 of the housing 18, elastomeric grommets 34 or other seals may be utilized. Likewise, the connection from the wiring harness 32 to the vehicle electrical system may be made with a weather-sealed plug 36 that mates to a corresponding socket connected to the power source. Those having ordinary skill in the art will recognize the specific connection modalities that are suitable for vehicle applications, and the illustrated embodiments show these features of the luminaire 10 by way of example only and not of limitation.

The illumination source 26 is understood to generate a substantial amount of heat, so the luminaire 10 may incorporate various thermal management features. In one embodiment, the illumination source 26 or the printed circuit board 28 may be mounted to a heat sink 38 that conducts away the heat. The heat sink 38 may be integral with the housing 18 as shown, and so there may be a plurality of fins 40 that assist in dissipating the heat into ambient air after being conducted away from the illumination source 26. In this regard, the heat sink 38/housing 18 may be constructed of aluminum or other material with high thermal conductivity. In addition to thermal conductivity, however, because the luminaire 10 is expected to encounter mechanical shock, moisture, extreme temperatures (both low and high) during normal service, the material selection for the housing 18 may also factor the durability and temperature resistance, among other qualities. As noted above, the shape and configuration of the housing 18, as well as the constituent fins 40 may be varied for achieve different aesthetic effects.

The luminaire 10 is envisioned to be mounted to a surface of a vehicle, and accordingly includes an adjustable bracket 42. Thus, the luminaire 10 may be rotated about a bracket pin 44 upwards and downwards to adjust the vertical aim. The illustrated adjustable bracket 42 is presented by way of example only, however, as any other suitable mounting modality may be substituted without departing from the present disclosure.

Figure 3:
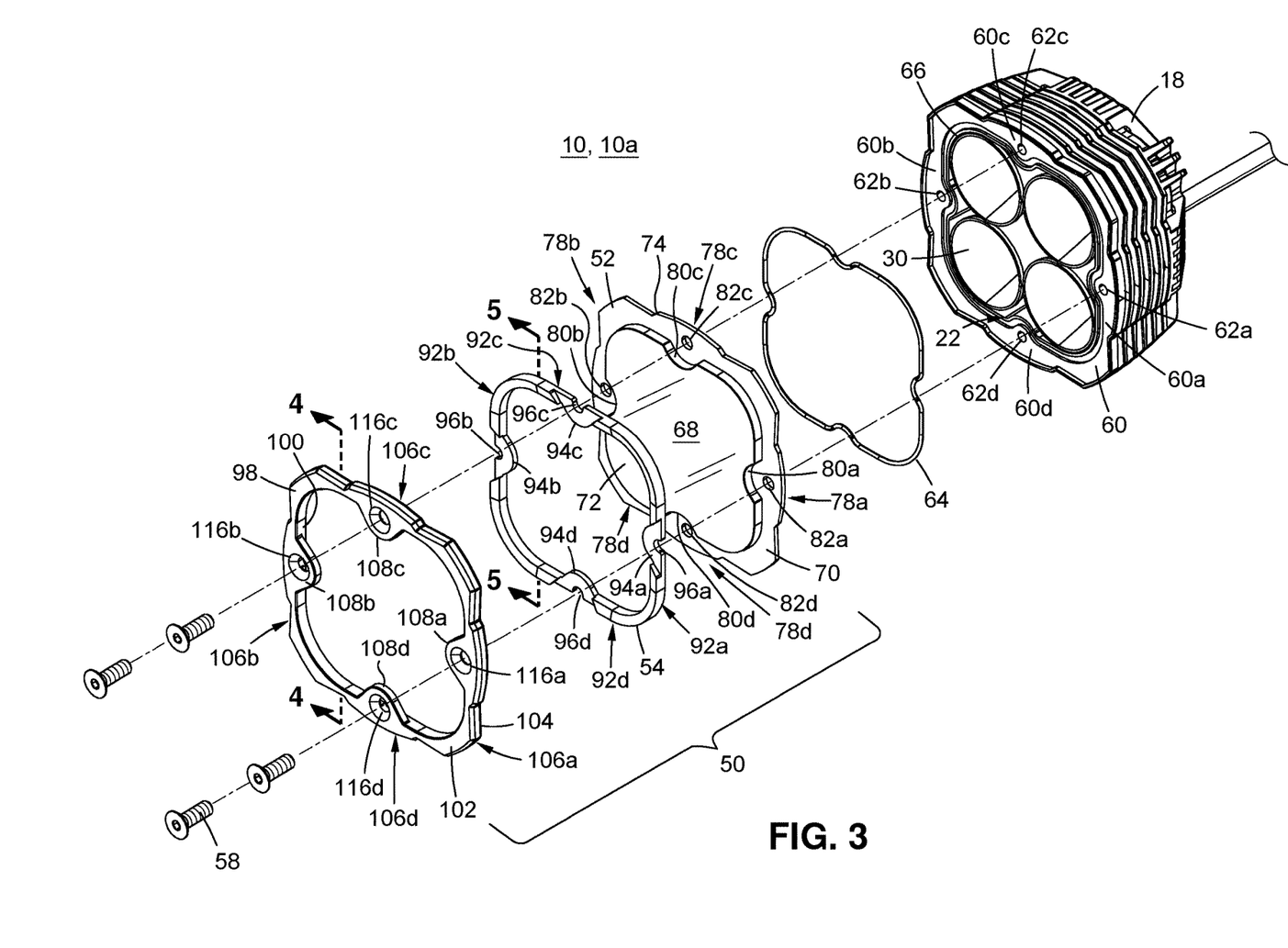
FIG. 3 is an exploded perspective view of the embodiment of the vehicle auxiliary light shown in FIG. 1, further detailing a luminaire bezel assembly in accordance with the present disclosure.

Still referring to FIG. 1 and FIG. 2, but additionally to the exploded perspective view of FIG. 3, the front face 12 of the luminaire 10 may be a bezel attachment assembly 50 that closes or seals off the open front end 22 of the housing 18. The bezel attachment assembly 50 incorporates a lens 52 that is constructed of a light-transmissive material that allows the light produced by the illumination source 26 to be emitted from the interior of the housing 18. Additionally, the bezel attachment assembly 50 incorporates an inner bezel 54, as well as an outer bezel 56. Together, the inner bezel 54 and the outer bezel 56 secures the lens 52 to the housing 18 with a set of fasteners 58.

The open front end 22 of the housing 18 defines a flat rim surface 60, which may be generally segregated into a right rim side 60a, a left rim side 60b, a top rim side 60c, and a bottom rim side 60d that corresponds to the sides 14a-14d, respectively, of the front face 12. Each of the rim sides 60a-60d is understood to define a corresponding fastener bore 62, that is, the right rim side 60a defines the right side fastener bore 62a, the left rim side 60b defines the left side fastener bore 62b, the top rim side 60c defines the top side fastener bore 62c, and the bottom rim side 60d defines the bottom side fastener bore 62d. The aforementioned fasteners 58 extend through or at least partially through the outer bezel 56, the inner bezel 54, and the lens 52, and into the respective fastener bores 62a-62d. The fasteners are understood to be threaded bolts, and so the fastener bores 62 are likewise understood to be correspondingly threaded.

Sandwiched between the lens 52 and the flat rim surface 60 of the housing 18 is an annular elastomeric seal 64 that prevents the incursion of moisture into the hollow interior 24. The flat rim surface 60 may define a seal groove 66 within which the annular elastomeric seal 64 is disposed to prevent movement of the same. The seal groove 66 is understood to extend around the circular contours of the reflector 30, though this is by way of example only.

In further detail, the lens 52 may be defined by a lens body 68 and a flange 70 around the lens body 68. Additionally, the lens body 68 may also be characterized as a raised platform from the rim of the flange 70. The lens 52 may have a front surface 72 and an opposed rear surface 74, with each of the constituent sections thereof, that is, the lens body 68 and the flange 70, likewise having corresponding front and rear surfaces. With additional reference to the perspective view of FIG. 6, the lens body 68 is defined by a front surface 72a and an opposed rear surface 74a, while the flange 70 is defined by a front surface 72b and an opposed rear surface 74b. The rear surfaces 74 of the lens 52 face and abut against the flat rim surface 60 of the housing 18. The lens body 68 defines a thickness or height 76 extending between the lens front surface 72a and the flange front surface 72b, spanning across the entirety of the profile of the lens body 68. Like the other components of the first embodiment of the luminaire 10a, the lens 52 has a quadrangular shape with respective left side 78a, right side 78b, top side 78c, and bottom side 78d.

Figure 6:
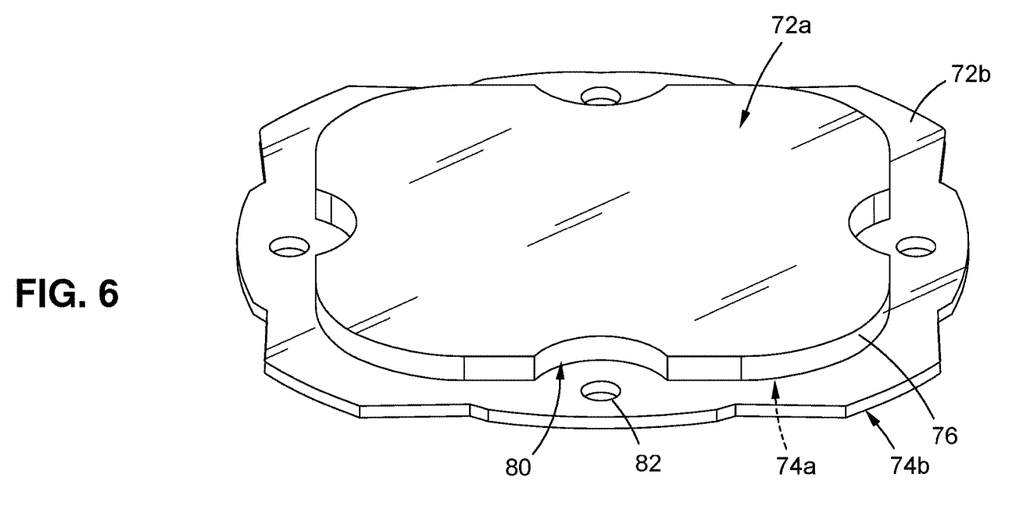
FIG. 6 is a detailed front perspective view of a lens that is part of the luminaire bezel attachment assembly.

With the lens 52 utilized in the first embodiment of the luminaire 10a, each of the sides 78a-78d define a corresponding bezel engagement keyway 80a-80d, respectively. Preferably, though optionally, the bezel engagement keyways 80 are centered along the respective sides 78. As shown, the bezel engagement keyways 80 are arcuate notches or insets into the lens body 68, with the flange 70 extending to the boundaries of the notch. The particular shape of the bezel engagement keyways 80, however, is presented by way of example only and any other suitable shape or size configuration may be substituted. Also defined in the flange 70 are a series of fastener apertures 82, of which there is a left fastener aperture 82a, a right fastener aperture 82b, a top fastener aperture 82c, and a bottom fastener aperture 82d. Each are located on the corresponding sides 78a-78d, though more particularly, centered with the corresponding bezel engagement keyways 80a-80d. The fastener apertures 82 are understood to receive the fasteners 58 and are accordingly positioned in axial, overlapping alignment with the fastener bores 62 defined by the flat rim surface 60 of the housing 18.

Figure 5:
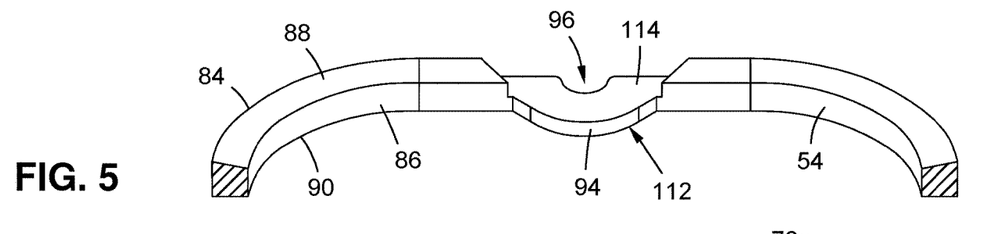
FIG. 5 is a partial cutaway front perspective view of an inner bezel that is part of the luminaire bezel attachment assembly taken along axis 5-5 of FIG. 3.

Referring additionally to the partial cutaway view shown in FIG. 5, the bezel attachment assembly 50 includes the inner bezel 54 with an outer rim 84 and an inner rim 86 that closely matches the contour of the lens body 68 such that it may be fitted thereon. Furthermore, the inner bezel 54 is defined by a front rim face 88 and an opposed rear rim face 90 that abuts against the front surface 72b of the flange 70 when the inner bezel 54 is attached to the lens 52. Again, like the lens 52 of the first embodiment of the luminaire 10a, the inner bezel 54 has a quadrangular shape with a left side 92a, right side 92b, top side 92c, and bottom side 92d. Each of the sides 92 defines an inner bezel key 94, including a left inner bezel key 94a, a right inner bezel key 94b, a top inner bezel key 94c, and a bottom inner bezel key 94d. In the illustrated embodiment, the inner bezel keys 94 may also be referred to as inwardly extending tabs.

The inner bezel keys 94 are contemplated to be received within the bezel engagement keyways 80 when the inner bezel 54 is attached to the lens 52, and therefore the contour of the inner bezel keys 94 is understood to match that of the bezel engagement keyways 80, e.g., arcuate and complementary thereto. Each of the inner bezel keys 94 protrude inwardly from the inner rim 86, and thus the rotational movement of the inner bezel 54 relative to the lens body 68 is limited. The outer rim 84 of the inner bezel 54, on the other hand, defines a series of central fastener slots 96 for each of the inner bezel keys 94a-94d, e.g., a left central fastener slot 96a, a right central fastener slot 96b, a top central fastener slot 96c, and bottom central fastener slot 96d. The central fastener slots 96 are understood to have a semi-circle shape that has substantially the same diameter as the fastener apertures 82 of the lens 52 and are in axial alignment therewith to receive the fasteners 58.

As best shown in FIG. 3, the bezel attachment assembly 50 also includes the outer bezel 56 with an outer rim 98 and an inner rim 100 that closely matches the contour of the inner bezel 54 and is fitted thereon. The outer bezel 56 is defined by a front rim face 102 and an opposed rear rim face 104 that faces and abuts against the flange 70 of the lens 52 when it is fitted on to the same. Similar to the lens 52 and the inner bezel 54, the outer bezel 56 is characterized by a quadrangular shape with a left side 106a, a right side 106b, a top side 106c, and a bottom side 106d. The left side 106a includes a left outer bezel key 108a, the right side 106b includes a right outer bezel key 108b, the top side 106c includes a top outer bezel key 108c, and the bottom side 106d includes a bottom outer bezel key 108d. Each of the outer bezel keys 108 protrude from the inner rim 100 and are received in the corresponding one of the bezel engagement keyways 80 while overlapping a respective one of the inner bezel keys 94. Thus, the outer bezel keys 108 may also be referred to as inwardly extending tabs. The contour of the outer bezel key 108 is understood to match that of the inner bezel key 94, e.g. arcuate and complementary to the bezel engagement keyway 80 defined on the lens 52.

Figure 4:
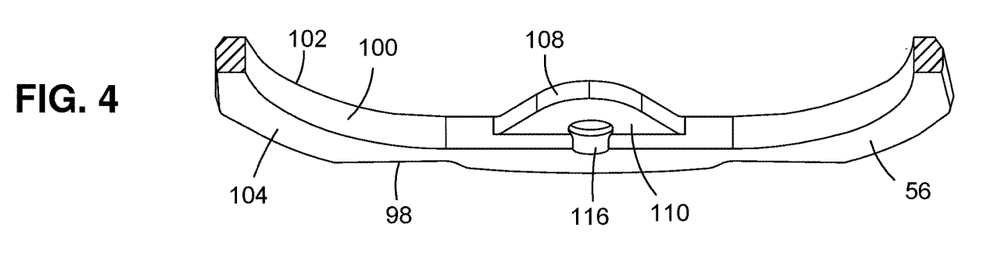
FIG. 4 is a partial cutaway rear perspective view of an outer bezel that is part of the luminaire bezel attachment assembly of the present disclosure, taken along axis 4-4 of FIG. 3.

The outer bezel keys 108 may be coplanar with the front rim face 102, but as shown in the detailed view of FIG. 4, a rear surface 110 of the outer bezel key 108 is not co-planar with the rear rim face 104. That is, the thickness of the outer bezel key 108 is less than that of the rest of the outer bezel 56, and a portion of the inner rim 100 continues uninterrupted across the width of the outer bezel key 108. This section is understood to conform to the straight edge of the outer rim 84 of the inner bezel 54.

Turning back to FIG. 5, the portion of the inner bezel 54 corresponding to the inner bezel key 94 is partially recessed, allowing for the outer bezel key 108 to overlap and be received within such recess. While a rear surface 112 of the inner bezel key 94 may be coplanar with the rear rim face 90 of the inner bezel 54, the opposite front surface 114 of the inner bezel key 94 is not coplanar with the front rim face 88. The thickness of the inner bezel 54 and of the outer bezel 56 may be substantially the same, with the outer bezel 56 surrounding the inner bezel 54.

A secured, interlocked relationship between the inner bezel 54 and the outer bezel 56 may be possible because of the mated inner and outer bezel keys 94, 108, with the outer bezel key 108 being further received within a recess defined by the inner bezel 54 and the inner bezel key 94 thereof. The rear surface 110 of the outer bezel key 108 thus faces and abuts against the front surface 114 of the section of the inner bezel 54' that corresponds to the inner bezel key 94. Though the specific thickness ratio may be varied, preferably, but optionally, the inner bezel key 94 and the outer bezel key 108 is half or at least less than the entire thickness of the respective bezel body. Combined together, the thickness of the inner bezel key 94 and the outer bezel key 108 add up to the thickness of the either the inner bezel 54 or the outer bezel 56, and encompass the entire thickness or height 76 of the lens body 68 as it is received within the bezel engagement keyway 80.

The outer bezel keys 108 also define a series of central fastener holes 116, with the left outer bezel key 108a defining a left central fastener hole 116a, the right outer bezel key 108b defining a right central fastener hole 116b, the top outer bezel key 108c defining a top central fastener hole 116c, and the bottom outer bezel key 108d defining a bottom central fastener hole 116d. Each of the central fastener holes 116 are understood to be in axial alignment with the respective one of the central fastener slots 96, the fastener apertures 82 of the lens 52, and the fastener bores 62 defined on the flat rim surface 60 of the housing 18. In one contemplated embodiment, the central fastener holes 116 may be countersunk to receive a tapered head fastener while the head is flush with the front rim face 102.

The outer rim 84 of the inner bezel 54, on the other hand, defines a series of central fastener slots 96 for each of the inner bezel keys 94a-94d, e.g., a left central fastener slot 96a, a right central fastener slot 96b, a top central fastener slot 96c, and bottom central fastener slot 96d. The central fastener slots 96 are understood to have a semi-circle shape that has substantially the same diameter as the fastener apertures 82 of the lens 52 and are in axial alignment therewith to receive the fasteners 58.

As indicated above, the shape of the luminaire 10 may be varied. Referring to the exploded view of FIG. 7, a second embodiment of the luminaire 10b has a generally triangular configuration characterized by a left diagonal side 118a, a right diagonal side 118b, and a top side 118c. These sides 118a-118c may have further sub segments angled relative to each other, these are understood to be aesthetic enhancements so it may nevertheless be referred to as having a generally triangular shape. The triangular configuration is presented by way of example only and not of limitation, and other shape variations are possible. Along these lines, similar to the first embodiment 10a, the second embodiment of the luminaire 10b includes a housing 18' though with a triangular open front end 122 and having all of the same features, including the reflector 30, illumination source 26, and so on. Because the housing 18' and the open front end 122 are triangular, so are the components of the bezel attachment assembly 50' and the elastomeric seal 64'.

Figure 7:
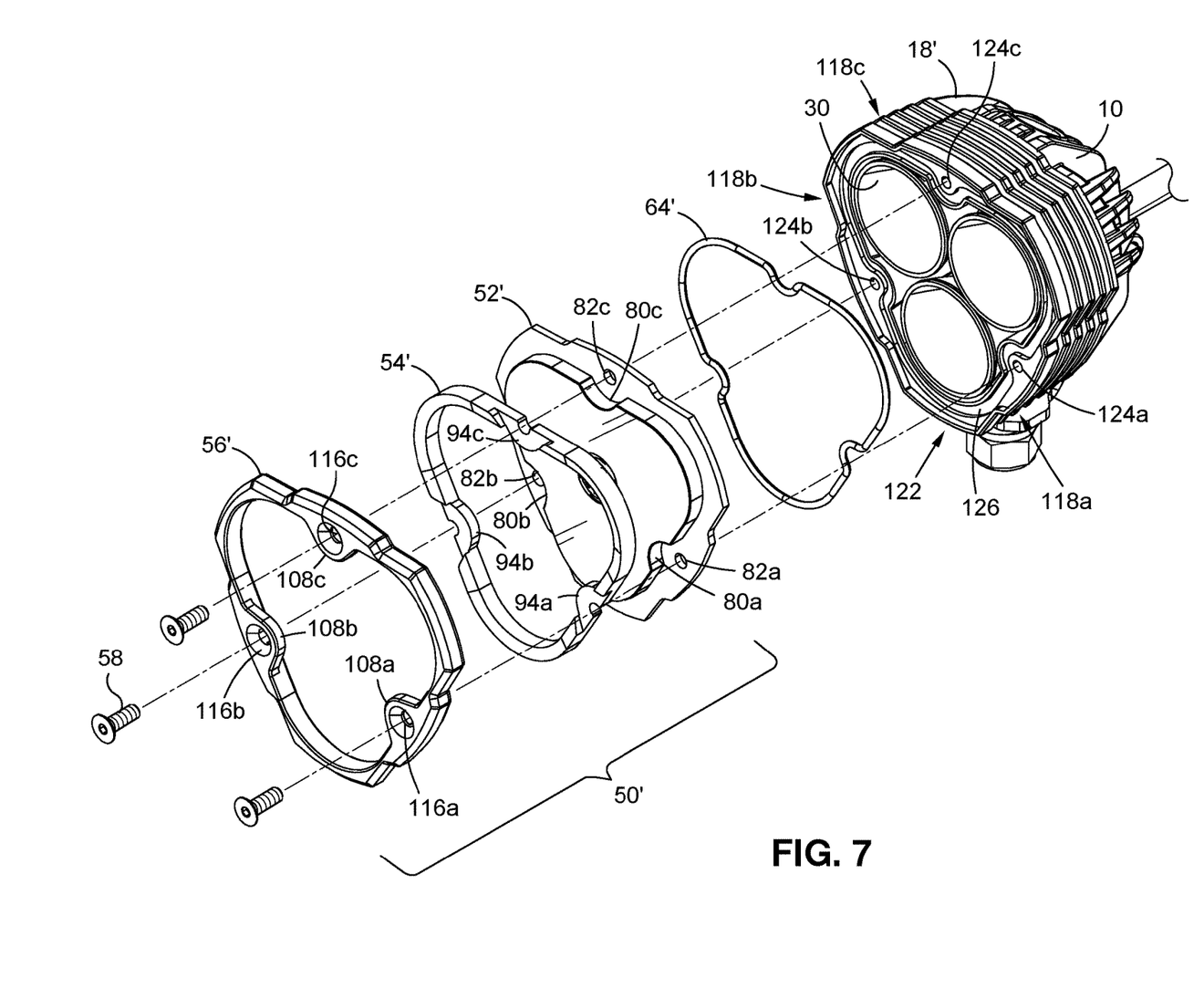
FIG. 7 is an exploded front perspective view of another embodiment of the vehicle auxiliary light with a triangular front face.

The second embodiment of the bezel attachment assembly 50' includes a second variation of the lens 52', along with a second variation of the inner bezel 54' and the outer bezel 56'. While these components are triangularly shaped, the other features of each are understood to be the same as in the quadrangularly shaped first embodiments of the lens 52, the inner bezel 54, and the outer bezel 56. Specifically, the lens 52 is characterized by the lens body 68 and the flange 70. There are three bezel engagement keyways 80a, 80b, and 80c corresponding to each side of the lens 52', and the portion of the flange 70 that defines the bezel engagement keyways 80 includes the fastener apertures 82.

The second variation of the inner bezel 54' is similarly engageable to the lens 52', and defines the same inner bezel keys 94a, 94b, and 94c for each of the sides of the inner bezel 54' that extend inwardly from the rim of the inner bezel 54'. The inner bezel keys 94a-94c are received within the bezel engagement keyways 80a-80c, respectively, when the inner bezel 54' is coupled to the lens 52'.

The second variation of the outer bezel 56' likewise includes the outer bezel keys 108 that extend inwardly from the rim thereof and received within the corresponding one of the bezel engagement keyways 80 of the lens 52'. Specifically, there is a left outer bezel key 108a, a right outer bezel key 108b, and an top outer bezel key 108c for the respective sides of the outer bezel 56'. Each of the outer bezel keys 108 overlap the corresponding inner bezel keys 94. The same mating/interlocking relationship of the outer bezel key 108 and the inner bezel key 94 as described above apply to this variation of the bezel attachment assembly 50'. Further, the outer bezel 56' defines the central fastener holes 116a-116c on the respective one of the outer bezel keys 108a-108c, and the inner bezel 54' defines the central fastener slots 96a-96c located in alignment with the inner bezel keys 94a-94c. The fasteners 58 are inserted through the central fastener holes 116, the fastener slots 96, and the fastener apertures 82 on the flange 70 of the lens 52', then threaded into fastener bores 124 defined by a rim 126, securing the bezel attachment assembly 50' to the housing 18'.

As illustrated by the foregoing, the specific shape and configuration of the luminaire 10 may be varied, with suitable modifications to the bezel attachment assembly 50 and the constituent components of the lens 52, inner bezel 54, and the outer bezel 56 being made to adapt the same attachment mechanism to such alternative shapes. The quadrangular configuration of the first embodiment 10a, and the triangular configuration of the second embodiment 10b have been presented by way of example only, and those having ordinary skill in the art may make additional modifications for other shapes and configurations of the housing 18.

Figure 8:
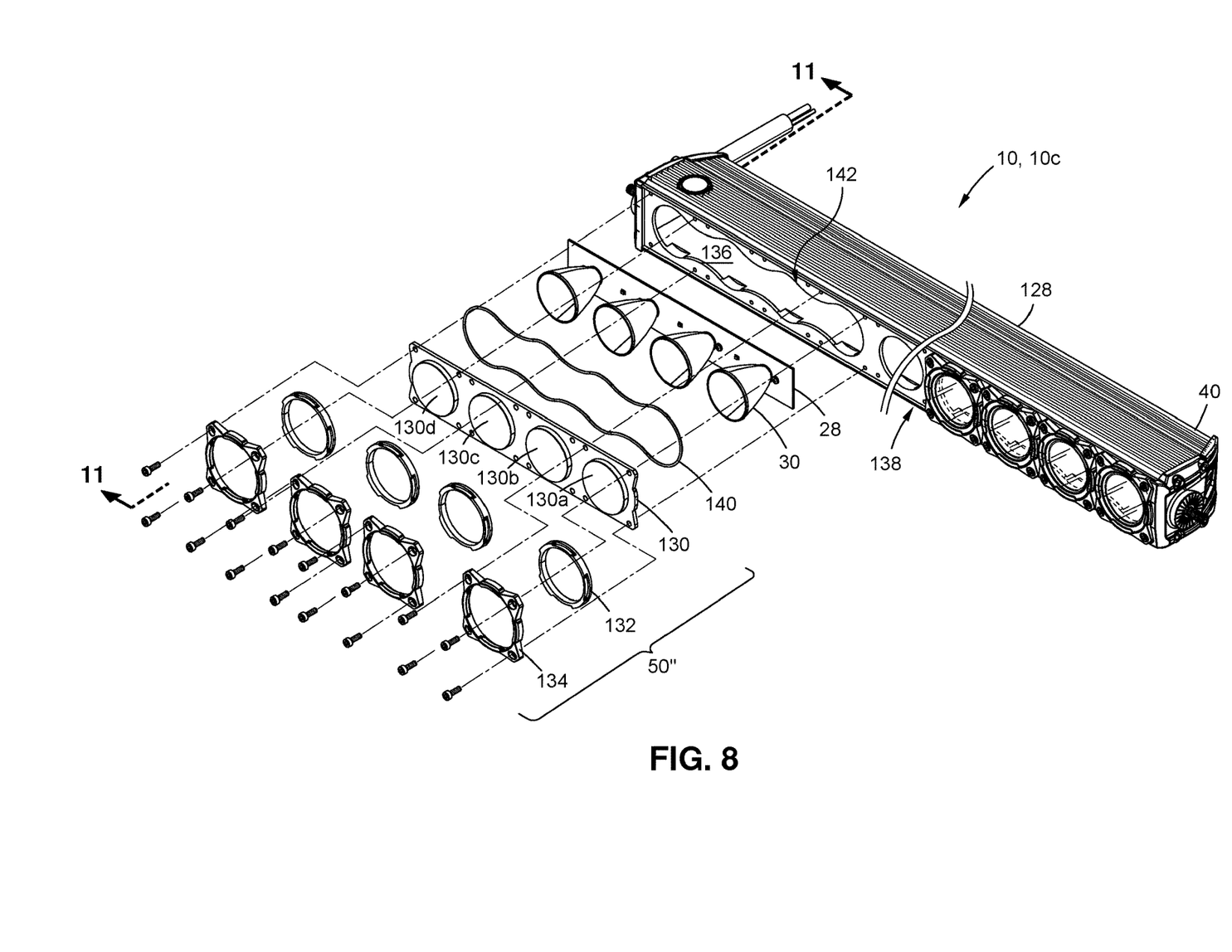
FIG. 8 is a partially exploded perspective view of a vehicle light bar with a luminaire bezel attachment assembly in accordance with an embodiment of the present disclosure.

Certain features of the disclosed bezel attachment assembly may also be adapted to other auxiliary lights, such as a light bar shown in FIG. 8 that may be more generally referred to as third embodiment of a vehicle auxiliary light luminaire 10c. Similar to the previously described embodiments, there is a housing 128, though having an elongate configuration to house multiple illumination sources 20 side-by-side and mounted on a rectangular printed circuit board 28. In the exemplary embodiment, Again, the exterior of the housing 128 includes fins 40 that serve as heat sinks to dissipate the heat generated by the illumination sources 20. Furthermore, the light outputted from the illumination sources 20 are directed forward with the reflectors 30. The printed circuit board 28 and the reflectors are disposed within a hollow interior 136 of the housing 128.

The third embodiment of the luminaire 10c also includes a bezel attachment 50" with an alternative configuration that may nevertheless incorporate a lens unit 130, one or more inner bezels 132, and one or more outer bezels 134. The inner bezels 132 may also be referred to as first annular interlocking bezels, while the outer bezels 134 may also be referred to as second annular interlocking bezels. The bezel attachment 50" is attached to a front face 138 of the housing 128, with an elastomeric seal 140 being disposed between the rear of the lens unit 130 and the front face 138/reflectors 30.

As shown in FIG. 8, the luminaire 10c and certain components thereof are configured as a set of four. For example, the single printed circuit board 28 includes four illumination sources, and the single lens unit 130 defines four lens bodies 131a, 131b, 131c, and 131d. Although the reflectors 30, the inner bezel 132, and the outer bezel 134 are provided individually, the housing 128 defines a single opening 142 into the hollow interior 136. This is by way of example only and not of limitation, however, and the luminaire 10c may be comprised of other multiples of the foregoing combined features, such as groups of three (where the opening 142 accommodates three illumination sources and associated reflectors, a lens unit 130 with three lens bodies, etc.), groups of two, and so on.

With reference to FIGS. 9, 10, 11, and 12, further details of the bezel attachment 50" will now be described. The lens bodies 131a, 131b, 131c, and 131d may be characterized as raised circular platforms from a flange section 144 surrounding the same. The flange section 144 is understood to be rectangular and generally conforms to the shape of the front face 138 of the housing 128. The lens unit 130 is defined by a front face 146 and an opposed rear face 148, with the lens bodies 131 having a lens body front face 146a, a lens body rear face 148a, and a lens body rim 149. Along these lines, the flange section 144 has a flange front face 146b and a flange rear face 148b. The lens body 131 may be extruded from the flange section 144 and a recess 150 is defined by the portion corresponding to the lens body 131 and the flange rear face 148b is not contiguous with the lens body rear face 148a. This is by way of example only, as there may be alternative configurations in which the flange rear face 148b is contiguous with the lens body rear face 148a. The flange rear face 148b additional defines a seal groove 152 within which the elastomeric seal 140 is positioned. The lens unit 130 may be formed as a unitary structure with a transparent or translucent material such as plastic, glass, etc.

Figures 9, 10:
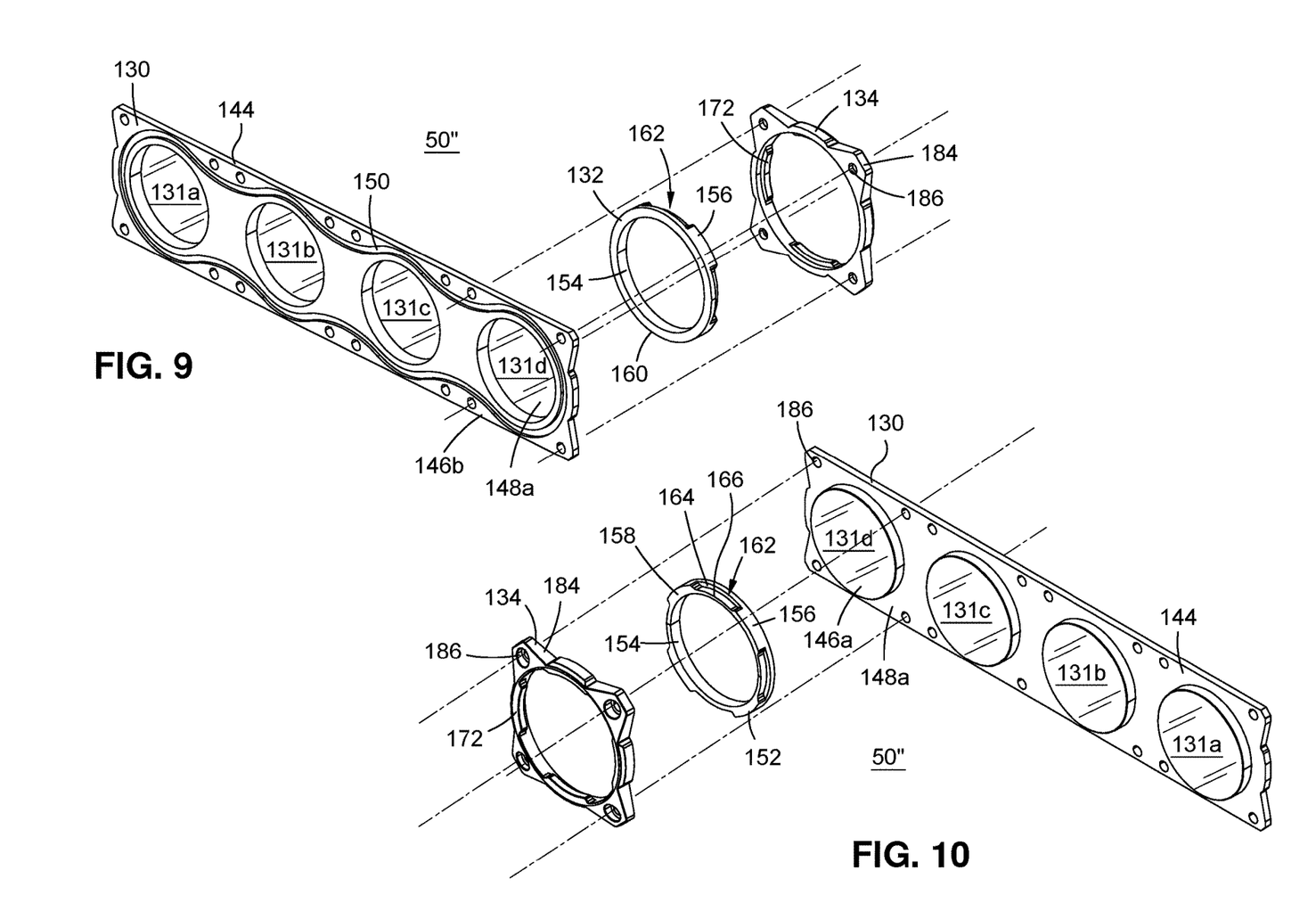
FIG. 9 is an exploded rear perspective view of the luminaire bezel attachment assembly.
FIG. 10 is an exploded front perspective view of the luminaire bezel attachment assembly.

The inner bezels 132, also referred to as the first annular interlocking bezel, is fitted around and on to a respective one of the lens bodies 131. To this end, the inner bezel 132 has an annular, e.g., ring-shaped configuration with an inner rim 154 and an outer rim 156, along with a front rim face 158 and an rear rim face 160. The inner rim 154 faces and abuts against the lens body rim 149 and are in sliding engagement with each other. The inner rim 154 and/or the lens body rim 149 may be dimensioned to maintain a freely sliding engagement, though other configurations to maintain some extent of frictional retention is also possible.

The outer rim 156 of the inner bezel 132 further defines a set of multiple, partially circumferential engagement recesses 162. These engagement recesses 162 are contemplated to extend partially into the body of the inner bezel 132 without extending fully between the front rim face 158 and the rear rim face 160. In this regard, the body of the inner bezel 132 is understood to define a constant inner rim 154, while sections of the outer rim 156 corresponding to the engagement recesses 162 defines a recess shoulder 164 and a recess neck 166 perpendicular thereto. As best illustrated in FIG. 10, the recess neck 166 has a circumferential taper on each side of the engagement recess 162 towards the outer rim 156.

The outer bezel 134, also referred to as the second annular interlocking bezel, is fitted around the outer rim 156 of the inner bezel 132. The outer bezel 134 is also defined by an inner rim 168 and an outer rim 170, along with a front rim face 172 and an opposed rear rim face 174. The inner rim 168 faces and abuts against the outer rim 156, either in freely sliding engagement or with some degree of frictional retention.

Figure 11:
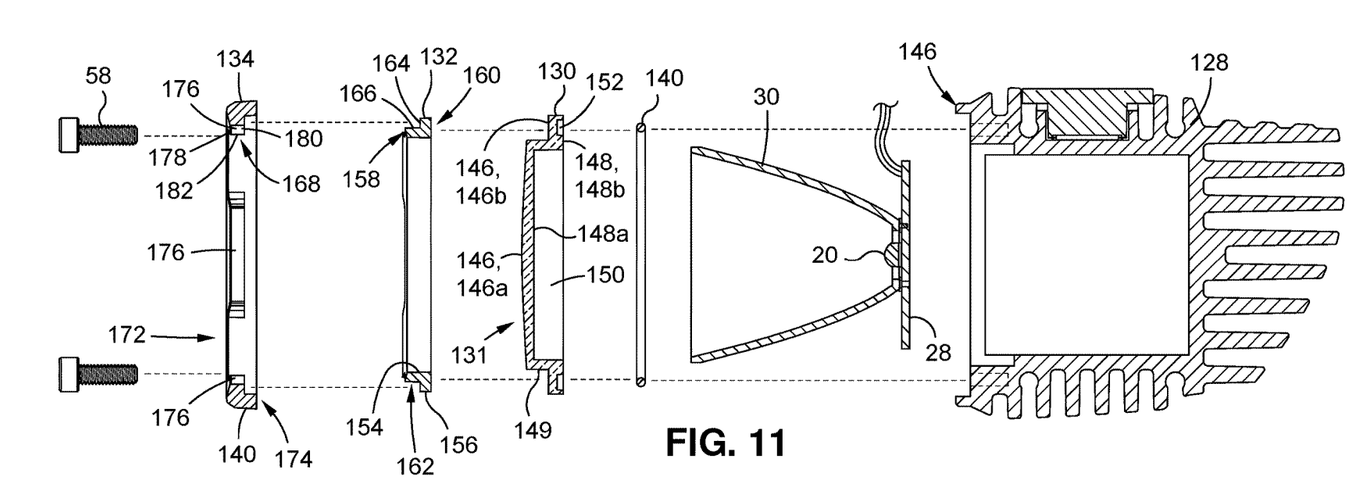
FIG. 11 is an exploded cross-sectional view of the vehicle light bar taken along axis 9-9 of FIG. 8.
Figure 12:
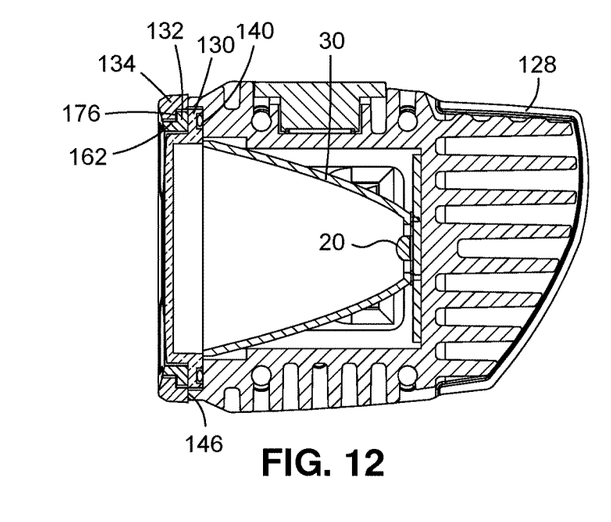
FIG. 12 is a cross-sectional view of the vehicle light bar.

As best shown in the cross-sectional views of FIGS. 11 and 12, the rear rim face 174 abuts against the front face 146 of the housing 128, with the inner bezel 132 being fully nested within the outer bezel 134. Unlike the inner bezel 132, the outer bezel 134 defines a constant outer rim 170. In addition, the inner rim 168 includes one or more inwardly extending tabs 176 that are sized and shaped to be received within the engagement recesses 162 of the inner bezel 132. The tabs 176 are defined by a front face 178, a flat rear face 180, and a tab rim 182. The abutting engagement between the outer bezel 134 (via the tabs 176, or more specifically the flat rear face 180 thereof) and the inner bezel 132 (via the engagement recesses 162, or more specifically the recess shoulder 164 thereof) is understood to couple the two against the housing 128. Furthermore, the tab rim 182 faces the recess neck 166 of the engagement recess 162. The thickness of the tabs 176, that is, the thickness dimension of the tab rim 182, is understood to correspond to the depth of the engagement recesses 162 of the inner bezel 132 that enables the aforementioned nested relationship between such components. The reduced stacking height is contemplated to minimize overall profile of the luminaire 10c.

The outer bezel 134 further includes a set of spaced outer tabs 184 each defining a fastener hole 186 that are placed into alignment with corresponding fastener holes 188 defined on the flange section 144 of the lens unit 130. By way of example, the outer tabs 184 may also be counterbored to receive the head of the fastener 58. The depiction of the outer tabs 184 is exemplary only, and any other suitable shape or size may be substituted without departing from the scope of the present disclosure.

The particulars shown herein are by way of example and for purposes of illustrative discussion of the embodiments of the vehicle auxiliary light luminaire bezel attachment assembly and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A luminaire bezel attachment assembly comprising:
    a lens defined by a lens body and a flange around the lens body, the flange defining one or more lens flange fastener apertures;
    an inner bezel coupled to the lens and defining one or more inner bezel fastener apertures and a front inner bezel face; and
    an outer bezel coupled to the lens and to the inner bezel, and defined by one or more outer bezel fastener apertures and a front outer bezel face;
    wherein corresponding ones of the inner bezel fastener apertures and the corresponding ones of the outer bezel fastener apertures are aligned with corresponding ones of the lens flange fastener apertures, and both the front inner bezel face and the front outer bezel face are exposed and in a concentric relationship with the inner bezel fitted within the outer bezel.

2. The luminaire bezel attachment assembly of claim 1, wherein
    the flange defines one or more bezel engagement keyways.

3. The luminaire bezel attachment assembly of claim 2, wherein:
    the inner bezel defines one or more inner bezel keys received within a corresponding one of the one or more bezel engagement keyways; and
    the outer bezel defines one or more outer bezel keys received within a corresponding one of the one or more bezel engagement keyways.

4. The luminaire bezel attachment assembly of claim 3, wherein one of the inner bezel keys is recessed to mate with a corresponding one of the outer bezel keys.

5. The luminaire bezel attachment assembly of claim 4, wherein one of the inner bezel keys protrude inwardly from a rim of the inner bezel.

6. The luminaire bezel attachment assembly of claim 5, wherein the one of the inner bezel keys is recessed relative to the front inner bezel face.

7. The luminaire bezel attachment assembly of claim 4, wherein one of the outer bezel keys protrude inwardly from a rim of the outer bezel.

8. The luminaire bezel attachment assembly of claim 7, wherein the one of the outer bezel keys is recessed relative to a rear outer bezel face.

9. A luminaire comprising:
    a housing defining at least an open front end with a rim defining one or more fastener bores;
    one or more illumination sources mounted to the housing;
    a lens defined by a lens body and a flange around the lens body, the flange defining one or more lens flange fastener apertures;
    an inner bezel coupled to the lens and defining one or more inner bezel fastener apertures and a front inner bezel face; and
    an outer bezel coupled to the lens and to the inner bezel, and defined by one or more outer bezel fastener apertures and a front outer bezel face;
    wherein corresponding ones of the inner bezel fastener apertures and the corresponding ones of the outer bezel fastener apertures are aligned with corresponding ones of the lens flange fastener apertures, and both the front inner bezel face and the front outer bezel face are exposed and in a concentric relationship with the inner bezel fitted within the outer bezel.

10. The luminaire bezel of claim 9, further comprising one or more fasteners each inserted through corresponding ones of the inner bezel fastener apertures, the outer bezel fastener apertures, and the lens flange fastener apertures.

11. The luminaire of claim 9, further comprising a sealing gasket disposed between the lens and the housing.

12. The luminaire of claim 9, wherein the flange defines one or more bezel engagement keyways.

13. The luminaire of claim 12, wherein:
    the inner bezel defines one or more inner bezel keys received within a corresponding one of the one or more bezel engagement keyways; and
    the outer bezel defines one or more outer bezel keys received within a corresponding one of the one or more bezel engagement keyways.

14. The luminaire of claim 13, wherein one of the inner bezel keys is recessed to mate with a corresponding one of the outer bezel keys.

15. The luminaire of claim 14, wherein one of the inner bezel keys protrude inwardly from a rim of the inner bezel.

16. The luminaire of claim 15, wherein the one of the inner bezel keys is recessed relative to the front inner bezel face.

17. The luminaire of claim 14, wherein one of the outer bezel keys protrude inwardly from a rim of the outer bezel.

18. The luminaire of claim 17, wherein the one of the outer bezel keys is recessed relative to a rear outer bezel face.

19. A luminaire bezel attachment assembly comprising:
a lens defined by a lens body and a flange around the lens body, the flange defining one or more lens flange fastener apertures;
an inner bezel coupled to the lens and defining one or more inner bezel fastener apertures and a front inner bezel face; and
an outer bezel coupled to the lens and to the inner bezel, and defined by one or more outer bezel fastener apertures and a front outer bezel face;
wherein corresponding ones of the inner bezel fastener apertures and the corresponding ones of the outer bezel fastener apertures are aligned with corresponding ones of the lens flange fastener apertures, and the outer bezel surrounding the inner bezel in a concentric relationship with both a circumference of the front inner bezel face and a circumference of the front outer bezel face being exposed.

* * * * *